Figure 1:
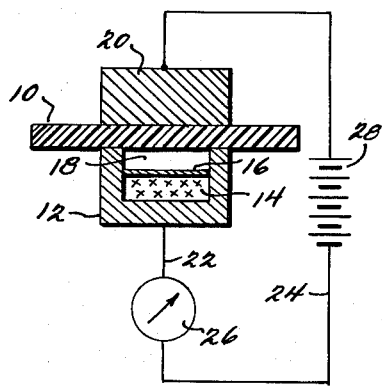

March 3, 1964    J. H. COLEMAN    3,123,511
RADIOACTIVE TREATMENT OF INSULATING MATERIALS
AND PROCESS AND APPARATUS FOR
MEASURING RADIOACTIVITY Filed July 21, 1952                              2 Sheets-Sheet 1

INVENTOR
JOHN H. COLEMAN

BY
ATTORNEYS

March 3, 1964 J. H. COLEMAN 3,123,511
RADIOACTIVE TREATMENT OF INSULATING MATERIALS
AND PROCESS AND APPARATUS FOR
MEASURING RADIOACTIVITY
Filed July 21, 1952 2 Sheets-Sheet 2

INVENTOR
JOHN H. COLEMAN

BY
*Semmes, Keegin, Robinson + Semmes*
ATTORNEYS

United States Patent Office 3,123,511
Patented Mar. 3, 1964

3,123,511
RADIOACTIVE TREATMENT OF INSULATING MATERIALS AND PROCESS AND APPARATUS FOR MEASURING RADIOACTIVITY
John H. Coleman, Palm Beach, Fla., assignor to Radiation Research Corporation, West Palm Beach, Fla., a corporation of Florida
Filed July 21, 1952, Ser. No. 300,022
1 Claim. (Cl. 156—272)

Thsi invention pertains generally to electric insulation materials, and more particularly to methods and means for utilizing charged particle or electromagnetic radiation to provide improved properties in insulation intended for uses where it will be subjected to radioactive emanations. In addition, the invention deals with the utilization of insulating materials, so treated, in the measurement of the rate or integrated dose of such radiations.

It is well known that the conductivities of ordinary insulation materials increase when the materials are subjected to certain quantities of electromagnetic or charged particle radiation, such as X-rays, electron bombardment or the like. The degree to which the conductivity is raised may seriously impair the electrical value of such materials, particularly when they are used for electrical insulation in apparatus which may be exposed to more or less intense radiation fields, such as around nuclear energy sources or the like. It is accordingly a principal object of my invention to provide ways and means for treating such insulating materials to render them immune to increases in conductivity resulting from irradiation, thereby providing for increased safety and reliability of electrical apparatus.

The applications of the invention disclosed herein stem from my discovery of the surprising fact that, while such insulating materials suffer from increased conductivity when exposed to irradiation of the kinds referred to, the increase in conductivity can be reduced or eliminated, or even reversed, by subjecting the materials to massive dosages of the same kinds of radiation. Thus, by subjecting insulation material to irradiation in the degree indicated, and set forth more specifically hereinafter, the conductivity can be reduced to a desired and safe value, which may be less than that of the irradiated material, as measured prior to the application of the increased dosage, and may even be less than that of the material prior to any irradiation.

Another surprising feature of my discovery is that, while the removal of the treated material from the radiation field allows its conductivity to return to the normal value which it had prior to any irradiation, the reapplication of the radiation results in the return of the conductivity value immediately to that which obtained just prior to the removal of the original radiation field. In other words, the material does not repeat the entire original cycle, passing through various stages of increased conductivity during which insulation failure might result, but instead goes at once to a relatively low value of conductivity corresponding to the total dosage to which the sample was exposed. The importance of this aspect of the invention may be understood when it is realized that it permits the preliminary treatment of suitable materials, following which they may be utilized as insulators for high radiation field applications without danger of increased conductivity.

It is therefore a further object of my invention to provide, as new compositions of matter, treated insulating material characterized by freedom from increases in conductivity under irradiations such as X-rays, electron bombardment, and high frequency electromagnetic radiations of other kinds, such as may be encountered near sources of such radiations.

Inasmuch as the conductivity of a sample of insulation having an unknown history (with regard to its exposure to radiations of the type under consideration) will depend upon whether, or to what extent, it has been irradiated, it is clear that my discovery also provides a way in which that history can be determined by measuring the conductivity of the sample while undergoing an exposure to radiation of known intensity or integrated value. It follows that the discovery can be utilized as means for measuring either the intensity or dose of radiation, by exposing a piece of the untreated insulation material to the unknown radiation, and thereafter measuring its conductivity under the conditions indicated.

It is accordingly a further object of my invention to provide a novel process and device for the measurement of radiation intensity or integrated dose, depending upon whether the actual time of exposure of the material is known or unknown.

Figure 2:
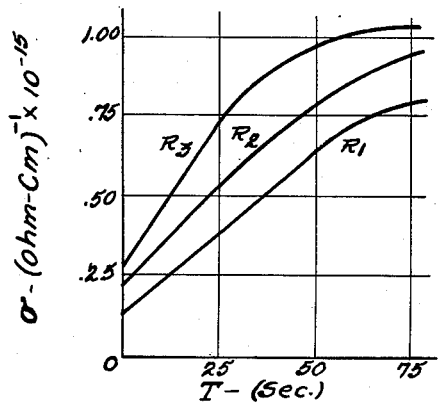
Figure 3:
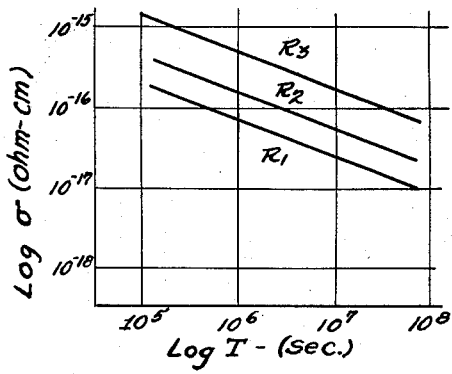
Figure 4:
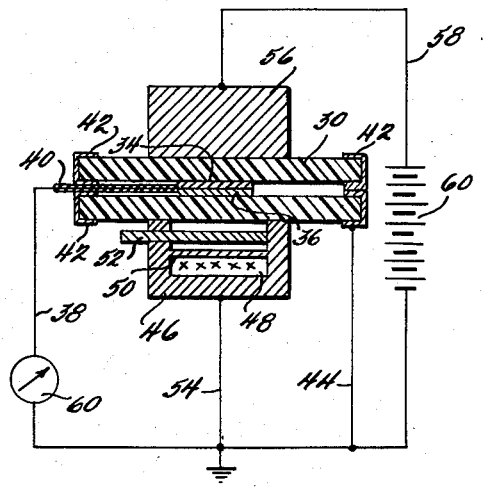
Figure 5:
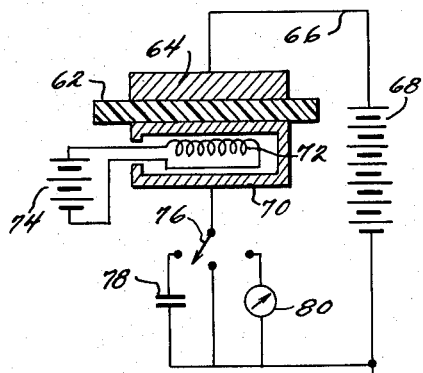
Figure 6:
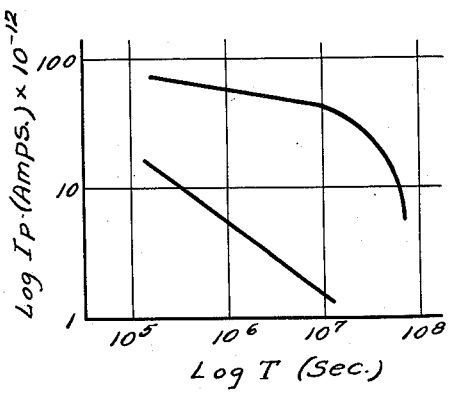
Figure 7:
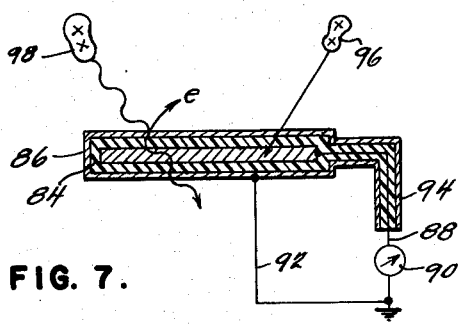
Figure 8:
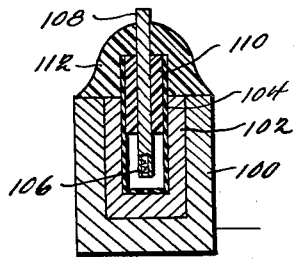
Figures 9, 10:
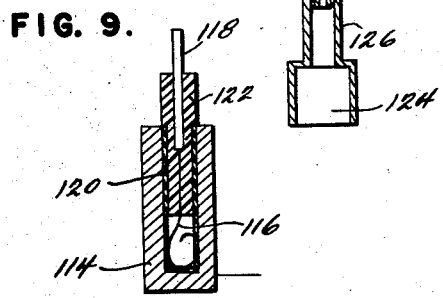

With the above objects and general considerations in mind, my invention and its applications will best be understood from a consideration of the following specification describing certain preferred embodiments of the invention, and taken in connection with the appended drawings, in which:

FIG. 1 is a schematic sectional view illustrating an arrangement useful in measuring the conductivity of irradiated samples of insulation (and also for treating such samples by irradiation), FIG. 2 is a graph showing the relationship between conductivity of a typical insulation material and the time of exposure to radiations of three different intensities, FIG. 3 is a similar graph showing the relationship between the logarithm of the conductivity of such a material and the logarithm of exposure times of a much higher order than in FIG. 2, FIG. 4 is a view similar to FIG. 1 but of a modified embodiment, FIG. 5 is a similar view of a third embodiment, having provision for varying the temperature of the sample of insulation, FIG. 6 is a graphical representation of the temperature effect utilized in the embodiment of FIG. 5, FIG. 7 is a vertical sectional view of an arrangement applying the principles of the invention to measurement of radiation, FIG. 8 is a similar view of one form of electric generator operating on nuclear principles, FIG. 9 is a sectional view of an embodiment of the invention providing a nuclear electric generator of simplified form, and FIG. 10 is a similar view showing the application of the invention to improvement in the insulation of a cable or cable connector of a form adapted for use with such a generator as that of FIG. 9, and for other purposes.

As has been stated, it is well known that insulators become relatively good conductors when exposed to electromagnetic or charged particle radiation. A report of the effect on polystyrene, and indicating a drop in volume resistivity of $10^8$ under 4000 roentgens of X-radiation, is given in an article by Dr. F. T. Farmer in Nature, vol. 150, page 521, October 1942. An article by Mr. L. Pensak in the Physical Review, vol. 75, pages 472–478, February 1, 1949, gave the results of electron bombardment of thin insulating films of amorphous silica, showing induced currents a hundred times greater than the bombarding currents. This "induced conductivity" effect has been utilized in my copending application Serial No. 242,011, filed August 15, 1951, to provide an electrical switch.

Other prior art devices utilizing the induced conductivity effect are summarized in an article by Dr. R. Hofstadter on "Crystal Counters" in Nucleonics, vol. 4, No. 4, pages 2-26, April 1949. All of these devices utilize the initial increase in electrical conductivity under radiation.

The present invention deals with my discovery that continued irradiation of certain insulators, beyond the point at which the induced conductivity ceases to rise, results in a decrease in the electrical conductivity, and that the final value of reduced conductivity can be restored, after a period of absence of irradiation, without passing through the increased conductivity phase, by again applying radiation to the material. This is a most surprising discovery, because heretofore I had assumed that the levelling off of the conductivity value, after initial irradiation is continued for a sufficient time, signalled a state in which no further changes in conductivity would result from continued irradiation.

The novel effect upon which the present invention is based can most readily be understood by referring now to FIG. 1 of the drawings, showing an arrangement for the irradiation of a thin disc of plastic such as polystyrene by beta electrons. In that figure, the plastic disc may be of the order of .010 inch thick, and is designated by reference numeral 10. A cylindrical block 12 of dense material such as lead or copper is formed with a cylindrical cavity containing a radioisotope 14 separated from the sample 10 by a thin disc window 16 which may be of .001 inch thick stainless steel. Beta electrons emitted from source 14 penetrate the window 16, pass through the opening 18 of the block 12 and impinge upon the plastic 10. Those electrons not collected in block 12, window 16 and insulator 10 are collected by a metallic collector cylinder 20. A suitable voltage is applied between the source block 12 and the collector 20 as by battery 28 and leads 22 and 24, and a sensitive current meter 26 is included in this external circuit.

The conductivity $\sigma$ of the plastic 10, in (ohm-centimeters)$^{-1}$ can be computed from the usual formula for an insulator bounded by parallel planes:

(1) $$\sigma = \frac{IL}{VA}$$

where I is the conduction current in amperes, V the applied voltage in volts, L the insulation thickness in centimeters, and A is the effective area of the radiation beam on the insulator, in square centimeters. The background beta electron current should be subtracted from the current indicated by meter 26, to determine the conduction current I, if the background current is of significant value. I have found that the induced conductivity is relatively independent of electric field strength, so that any required correction for background current can be determined at zero field strength.

Referring now to the graph of FIG. 2, the measured conductivity of the sample is plotted as a function of the time T after the radiation is applied, and for three different radiation rates $R_1$, $R_2$ and $R_3$ of increasing intensity. In the case of the polystyrene sample 10 of FIG. 1, a 25 millicurie source of strontium 90 was used as the source, and gave an electron current to collector 20 of approximately $40 \times 10^{-12}$ amperes for $R_3$. This current was reduced ¾ and ½ that value for $R_2$ and $R_1$ respectively. The diameter of the opening 18 was 1.5 inches.

As shown by the curves in FIG. 2, the conductivity is roughly proportional to the radiation rate during the first second of irradiation, that is, immediately after time T equal to zero. The slope of the curves, or increase in conductivity with time is also proportional to radiation time until the maximum conductivity is approached. The conductivities then level off to respective maximum values which are roughly proportional to the square root of the radiation rate. This is the induced conductivity effect which has been noted many times. I have found, however, that if the irradiation of the specimen 10 is continued, for example for a time of the order of one day, an actual decrease in conductivity is obtained. A time of this order is, of course, much longer than any which can be represented on the graph of FIG. 2, and recourse is therefore had to the logarithmic plot of FIG. 3.

In FIG. 3, the logarithms of conductivity are plotted against logarithms of exposure time, the curves being again denoted by the characters $R_1$, $R_2$ and $R_3$ as before. The decrease in conductivity observed under the conditions noted has been found to follow a law which may be expressed:

(2) $$\sigma = \frac{KR^n}{T^m}$$

where R is the radiation intensity, T the exposure time, and K, $m$ and $n$ are constants. Tests indicate that $m$ and $n$ are approximately equal to one-half. As stated, it was found that the conductivity so obtained was independent of the direction and magnitude of the electric field. Also, as has been intimated, it was found that if the radiation source 14 is removed, the insulation conductivity at room temperature returned to its value prior to irradiation. If the radiation source 14 is again applied, the value of conductivity returns to the value which it had immediately prior to removal of the radiation source, rather than repeating the cycle which starts with FIG. 2. The effect of elevated temperature on the conductivity after removal of the radiation will be discussed in connection with FIGS. 5 and 6.

The general characteristics just described are observed also in connection with other good insulators such as mica, amber and polymonochlortrifluoroethylene. However, in the case of this latter plastic insulator, the decrease in conductivity was terminated by physical degradation due to the radiation. A higher molecular weight and fiber glass reinforcement tend to delay the degradation time. Other plastics such as polyethylene degrade so rapidly that the improvement in conductivity is insignificant compared to the effects of internal leakage through crazing. Under prolonged life tests, polystyrene, mica and amber have shown no significant degradation of physical properties.

It has also been observed that some additional improvement in induced conductivity after radiation treatment can be obtained by adding small quantities of impurities to the plastics, which act to trap conduction electrons. For example, anti-oxidants such as polyhedric phenol and amine (say di-octylamine) have been found to reduce the conductivity of polystyrene under radiation of the degrees indicated herein.

Without limiting the invention to any particular theory of the underlying causes for the effects disclosed, it may be helpful to suggest a possible mechanism which could account for the phenomena, and this can be done briefly utilizing the nomenclature of modern physics as applied to electron conduction. Referring again to FIG. 1, it is considered that the impingement of each beta ray upon the plastic 10 frees several thousand electrons from the molecular structure. The actual number can be calculated when the amount of energy lost is known; for example, a loss of 150,000 electron-volts in a few thousandths of an inch would result in at least 10,000 free electrons being formed, since only 15 volts or less is required per electron. These electrons are captured almost immediately by electron traps in the molecular structure of the plastic, the initial conductivity (e.g., as represented in FIG. 2) being determined by the length of free time and consequently the distance traveled. This means that the initial conductivity $\sigma_0$ is proportional to the production rate P of the electrons and their free lifetime $T_1$, or (3) $$\sigma_0 \propto PT_1$$
where
(4) $$P = CR$$

C being a constant and R being the radiation rate. In the case of gamma rays, fewer electrons are released per centimeter, but the effect is the same.

Now the increase in conductivity under continued irradiation is due to the "boiling out" of these trapped electrons into the "free" state again. These freed electrons are again trapped, but contribute a component to the conductivity which is proportional to the distance traveled $\Delta X$ over the thickness of plastic $t$. The distance traveled is, of course, equal to the mobility, $\mu$, times the field strength E times the lifetime, or (5) $$\Delta X = \mu E T_1$$

Thus, the slope or increase in conductivity per unit of time is proportional to the production rate P and inversely proportional to the time the electron remains in a trap, which time can be designated $T_2$. Then (6) $$\frac{\Delta \sigma}{\Delta t} \propto P \frac{T_1}{T_2}$$

A maximum is reached since an equal number of positive holes are produced by the radiation as electrons which are produced. These positive holes then recombine with free electrons when a certain density is reached. The maximum conductivity can be calculated to be proportional to the square root of P. After the maximum is reached, the conductivity declines approximately according to the formula (7) $$\sigma \propto \sqrt{\frac{R}{t}}$$

where $t$ is the time elapsed since the radiation was first applied.

If the radiation is removed before the maximum conductivity is reached and re-applied, the curves of FIG. 2 almost repeat themselves. On the other hand, removal of the radiation after the maximum is passed and then re-applying radiation causes a return to the value of conductivity attained before the radiation was removed, rather than going again through the maximum value such as in FIG. 2. An explanation of this is that two effects are making themselves felt: (1) more traps are produced by the radiation, and (2) the shallow traps are being filled up causing electrons to go to very deep traps which have practically infinite trap life. Thus, continued irradiation continually decreases conductivity after the maximum is passed. Removal of the radiation at this stage does not decrease the new traps or boil electrons out of the filled traps.

Some confirmation of the above explanation has been obtained on the basis of temperature tests which show that after application of heat and an electric field, a piece of irradiated plastic actually does start back along the FIG. 2 cycle as though it had been irradiated only slightly.

Referring now to FIG. 4, apparatus is illustrated by which the background current of FIG. 1 is reduced, to permit the memory effect of the conductivity of the plastic, in accordance with FIG. 3, to be utilized. The upper plastic sheet 30 corresponds to 10 of FIG. 1, and a duplicate sheet is shown beneath the first one and between it and the radiation source. A thin conducting electrode 34, 36 is provided on each sheet and may comprise a layer of .0005 inch thick graphite, having an area at least equal to the cross-section of the radiation beam. The two sheets are thus in electrical contact at this area, and a potential is applied to the electrodes as by a conductor 38 which passes between the sheets through an insulating tube 40, which insulates lead 38 from the guard rings 42 around each sheet; these latter may comprise a graphite coating around the rim of each sheet, connected to ground as at lead 44. The source comprises the block 46 having a cavity containing the radioisotope 48 and the metal window 50 as described in connection with FIG. 1. However, an impervious shutter 52 is arranged to slide across the opening of the source block to permit the radiation to be prevented from reaching the plastic insulation sheets when desired.

A lead 54 connects the source block 46 to ground, and a collector 56 is connected by lead 58 and potential source (battery) 60 to ground. The conduction current through sheet 30 can thus be read on meter 60, while the background beta current flow between the source electrode 46 and the collector 56 passes to ground via lead 54 and by-passing meter 60. Thus a more accurate determination of conductivity can be made, since only the small radiation current absorbed in the lower plastic sheet is superimposed on the conduction current.

In operation, the total quantity or dose of previous radiation of an insulator can be determined by first opening the shutter by hand and applying voltage 60 to measure the conductivity under the known radiation from source 48. Using Equation 2, either the rate or time of the previous radiation can be computed if one or the other is known. Obviously, the same result can be obtained with the FIG. 1 apparatus if less accuracy is needed.

In FIG. 5, a condenser arrangement is formed by the insulating sheet 62 and the electrodes 64 and 70; these may be cylindrical as before, and the upper electrode or collector has a lead 66 extending to potential source 68 and thence to ground. To raise the temperature of the insulation 62, the lower electrode 70 may contain a heating coil 72 energized by a battery 74. A switch 76 enables the electrode 70 to be connected to the ground through a condenser 78 (first position), directly to ground (second position) or through sensitive meter 80 (third position). When voltage is applied to the un-irradiated insulation, the usual polarization current flows through meter 80 in the third position of the switch. The switch should first be connected direct to ground, however, on first applying the voltage, until the capacity charging current is diminishingly small.

Using the equipment of FIG. 5, the resulting polarization current $I_p$ as a function of time T is shown in FIG. 6. The lower curve of this figure was obtained for polystyrene .003 inch thick, 1½ inch diameter electrodes 64 and 70, and a voltage of battery 68 of 1500 volts. Next, the temperature was raised from room temperature (25° C.) to 80° C. and the polarization current was essentially the same. An insulator was then irradiated for a short period of time, in a unit similar to that shown in FIG. 1, the conductivity following the curves of FIGS. 2 and 3. The sheet was removed from the radiation field and the polarization current measured in the apparatus of FIG. 5.

The room temperature polarization current, or corresponding conductivity, was essentially the same as a function of time as in the case of the un-irradiated sheet. On the other hand, elevating the temperature to 80° increased the polarization current to that shown by the upper curve of FIG. 6. Thus, calibration curves could be established experimentally for use in determining an unknown dose of radiation. The same general effect was found in insulators such as polyethylene, but the latter would be limited to radiation doses not high enough to cause physical degradation and short circuits. A condenser 78 could be used to collect the total charge instead of reading the current. For field use, and as a practical matter, the meter 80 could be omitted and the potential developed across the condenser read by a high impedance voltmeter.

FIG. 7 shows another way in which rate of radiation can be measured. In this figure, a sheet of the treated plastic, such as polystyrene, is shown at 84 and completely surrounds a collector electrode forming the core of the unit and to which is connected by lead 88 the sensitive meter 90. A lead 92 connects this meter to an outer sheath 86 which may be evaporated aluminum .0005 inch thick. Electrical shielding around the conductor 88 is indicated at 94 and is connected to the sheath 86.

In operation as a gamma ratemeter, the core electrode may be of a dense material such as lead, which ejects Compton electrons and photoelectrons as indicated at $e$ when irradiated by a gamma source 98. These electrons penetrate insulation 84, if of sufficient velocity, and cause a current to flow in meter 90. For operation as a charged particle ratemeter, the particles such as beta electons from source 96 are simply collected on electrode connected to lead 88, and the current flow read at meter 90. Obviously, several such units could be connected in parallel.

In the case of gamma measuring operations with this unit, some electrons are ejected from the thin, low density outer layer 86, but the dense inner electrode is the predominant source. Another application for this device is as a converter for gamma rays into useful electric current, by simply replacing meter 90 with a load. An inexpensive radioisotope such as cobalt 60 or mixed fission products could be used.

FIG. 8 shows an improved nuclear electric generator using the insulation disclosed above. The source of radiation comprises a radioisotope such as strontium 90 or thallium 204 coated upon the inside of a thin (.001 inch) aluminum cylinder 106. The radioactivity of such radioisotopes is characterized by a decay process involving the emission of beta rays or electrons in the absence of a fission reaction. Contact is made to one end of cylinder 106 by a solid rod 108 of material such as copper which becomes the anode for an external circuit. Rod 108 is held by glue such as a vinyl compound, to the insulating cylinder 110, which can be molded from material such as polystyrene which is radiation treated by irradiation (at least, as to the part which will be under bombardment in use) with an intense beta source prior to assembly. Radiation treatment by delay in use after assembly can also be used to reduce the change in conductivity with time. The cylinder 110 can be glued, by a solvent such as toluene, to the insulating cup 104. The insulating cup 104, as in the case of insulating cylinder 110, may be radiation treated by exposure to irradiation from an intense beta source prior to assembly or radiation treatment by a delay in use after assembly may be used. In operation, the beta electrons from source 106 penetrate the insulation 104 and are collected by the cup 102 which is machined from low density material such as aluminum, to reduce the bremstrahlung. Additional shielding 100 such as lead can be added to reduce any bremstrahlung from 102. Electrical contact can be made to the collector 102 and shield 100 by wires as indicated. A low leakage potting compound 112, such as National Bureau of Standards AN-5 with a styrene base, can be used, and to prevent it from reacting with the lower part of 104 and possibly degrading some physical or electrical properties, the upper part of insulator 104 can be glued to the neck of cup 102 with Epoxy resin.

In FIG. 9 is shown a simplified nuclear electric generator formed by painting a conducting coating on the inside of the radiation insulator 120 which contains a radioisotope. A thin wire 116 such as .015 diameter aluminum protrudes from the insulating cylinder 122 to make contact with this coating and the isotope. Some of the electrons which penetrate upward into the bottom face of 122 will still contribute some of their energy to electric energy; whereas, in the case of the solid rod electrode such as 108 of FIG. 8, nearly all the electrons entering the lower face are lost. A larger diameter rod 118 is connected to wire 116 in the region of 122 sufficiently removed from the source of radiation; this rod 118 forms the anode for the external circuit. In manufacture, the isotope in solution form, such as strontium chloride in water, could be deposited on the conductive coating within cylinder 120 and evaporated with dry heat. The insulator 120 could then be inserted within collector 114 and glued in place as described in connection with FIG. 8. The radiation conductivity of the insulation could be decreased by previous irradiation from a strong source, as described earlier herein, and potential could be applied during this irradiation, by contact with the conducting layer inside 120, and with the ionized air outside 120. Only the low density collector 114 is shown; however, additional shielding such as in FIG. 8 could be used, or shielding provided by the equipment into which the generator is inserted, such as the wall of a land mine.

In FIG. 10 there is shown a shielded cable which is particularly suited to nuclear electric generators, and especially to the form shown in FIG. 9. The outside cylindrical conductor 126 fits snugly over an insulator such as 122 of FIG. 9. A larger diameter cylinder 124 can fit over the collector 114 of FIG. 9. The center conductor 118 of FIG. 9 makes contact when it slips into the open end of a cylindrical cup 128 which is held by the insulation 130 in such a way that no air gap can exist between the outer conductor 126 and the inner cylinder 128. The center conductor 132 is attached to the closed end of cylinder 128 and supported by the insulation 130. The elimination of air gaps is important for nuclear work since air therein would ionize under radiation and result in leakage current. Once outside the radiation field, of course, conventional cable and connectors could be used. Obviously, the radiation conductivity of the cable and connector insulation is to be decreased by prior irradiation as pointed out above, with or without the application of potential during the irradiation. Such irradiated cable would be particularly useful for sensitive nuclear measuring equipment such as electrometer cable, connections to ion chambers or therein, for insulation used in nuclear reactors, or for any type of insulation in danger of failure from an atomic bomb.

The radiations referred to herein have been designated as to type, but it is to be understood that besides those mentioned, X radiation, cathode rays and the like are included. All such are also intended to be covered by the term ionizing radiation as used in the appended claim.

While the invention herein has been described in detail as to its operation and the construction of various embodiments, the principles of the invention can be applied in a variety of other ways. It is therefore to be understood that the invention is not to be construed as limited to the details disclosed, but only by the scope of the appended claim.

What is claimed is:

In the method of manufacturing an electrical device for use in a field of ionizing radiation wherein said device includes a dielectric material which when exposed to ionizing radiation at a constant rate has a characteristic decrease in volume resistivity, the steps of irradiating said dielectric material with ionizing radiation selected from the group consisting of beta, gamma, X and cathode rays having sufficient energy to permeate said dielectric material and at a predetermined rate for a time such that the volume resistivity of said dielectric material is decreased to a minimum and is then increased to a value greater than said minimum whereby the operating volume resistivity of said dielectric material when exposed to ionizing radiation at said predetermined rate is at least equal to said value so as to improve the operating resistivity characteristic of said device when utilized in an environment of ionizing radiation, and assembling said electrical device with said dielectric material as an element thereof.

References Cited in the file of this patent

UNITED STATES PATENTS

| | | |
|---|---|---|
| 2,437,913 | Frondel | Mar. 16, 1948 |
| 2,517,120 | Linder | Aug. 1, 1950 |
| 2,543,039 | McKay | Feb. 27, 1951 |
| 2,552,050 | Linder | May 8, 1951 |
| 2,562,138 | Bump | July 24, 1951 |
| 2,604,596 | Ahearn | July 22, 1952 |
| 2,651,730 | Linder | Sept. 8, 1953 |
| 2,661,431 | Linder | Dec. 1, 1953 |
| 2,728,867 | Wilson | Dec. 27, 1955 |
| 2,763,609 | Lewis et al. | Sept. 18, 1956 |

(Other references on following page)

UNITED STATES PATENTS

| | | |
|---|---|---|
| 2,768,313 | Rappaport | Oct. 23, 1956 |
| 2,810,850 | Linder | Oct. 22, 1957 |
| 2,859,361 | Coleman | Nov. 4, 1958 |

OTHER REFERENCES

"Summary of Available Data on Radiation Damage to Various Non-Metallic Materials," by E. L. Mincher, AEC Document KAPL-731, April 2, 1952.

"The Effects of Radiation on Materials," by J. C. Slater, Journal of Applied Physics, vol. 22, No. 3, pp. 237-256, March 1951.

"Physical Properties of Irradiated Plastics," by O. Sisman and C. D. Bopp, AEC Document ORNL-928 (1951).

"Radiation Effects in Solids," chapter by G. J. Dienes (March 1952), pp. 187-220, in Annual Review of Nuclear Science, vol. 2 (1953).

Serial Number 170,877 (filed June 28, 1950), now abandoned.

Serial Number 177,015 (filed August 1, 1950), now abandoned.

Gemant: "Ionization of Paraffin Wax by Beta-Radiation"; October 1949; J. of Applied Physics, vol. 20, pp. 887-891.

BNL-141; "Preliminary Studies on Industrial Applications of Intense Gamma Radiation"; December 1, 1951; 15 pp.; United States Atomic Energy Commission publication.

Coleman and Bohm: "A Method for Increasing the Electrical Resistivity of Insulators Under Ionizing Radiation"; J. of Applied Physics, April 1953; vol. 24, pp. 497-498.

Sun: "Effects of Atomic Radiation on High Polymers"; Modern Plastics; September 1954; pp. 141, 144, 146, 148, 150 and 229-232 relied upon.

Feng et al: "Electrical and Chemical Effects of Beta-Radiation in Polystyrene"; American Chemical Society Journal; vol. 77, No. 4; February 28, 1955; pp. 847-851.

Charlesby: "The Effect of High Energy Radiation on Some Long-Chain Polymers"; Plastics (London); vol. 18, No. 190, May 1953; pp. 142-145.

Schmitz et al: "Initiation of Vinyl Polymerization by Means of High-Energy Electrons"; Science, vol. 113; June 22, 1951; pp. 718 and 719.

Winogradoff: "X-Ray Irradiation of Polystyrene, Polythene and Paraffin Wax"; Nature; vol. 165, January 21, 1950; page 123.

Coleman: "Radioisotopic High-Potential Low-Current Sources"; Nucleonics; December 1953; vol. 11; pp. 42-45.

Rappaport and Linder: "Radioactive Charging Effects With a Dielectric Medium"; J. of Applied Physics; vol. 24; September 1953; pp. 1110-1114.

MDDC-962; "Effects of Radiation on Materials"; United States Atomic Energy Commission publication; pp. 1-3 relied upon.

L-P-406a; "Federal Specification for Plastics, Organic: General Specifications, Test Methods"; January 24, 1944, U.S. Government Printing Office; pp. 47-52 relied upon.

AECD-2078; The Effect of Radiation on the Physical Properties of Plastics, by J. G. Burr and W. M. Garrison; date of manuscript, December 6, 1943, pp. 17.

AECD-3634; Behavior of Certain Plastics and Elastomers Under Irradiation; 1948; page 23.

AECD-2641; Conductivity Changes in Dielectrics During 2.5 Mev. X-Radiation; by F. C. Armistead et al.; page 3.

Farmer, F. T.: Electrical Properties of Polystyrene; Nature, volume 150, page 521, October 1942.

Pensak, L.: Physical Review; vol. 75; pages 472-478; February 1, 1949.

Coleman, J. H.: Annual Report of Conference on Electrical Insulation; 1954; pages 51-54, C56.

Curie, Marie (Sklodowska): "Radio-Active Substances," 1904, second edition printed by Chemical News Office, London; pp. 37-40.

Charlesby: "Effect of High-Energy Radiation on Long-Chain Polymers," Nature, vol. 171; January 24, 1953; p. 167.